Feb. 19, 1963　　　A. M. A. MAJENDIE ETAL　　　3,077,787
GYRO VERTICALS
Filed April 14, 1958　　　　　　　　　　　　2 Sheets-Sheet 1
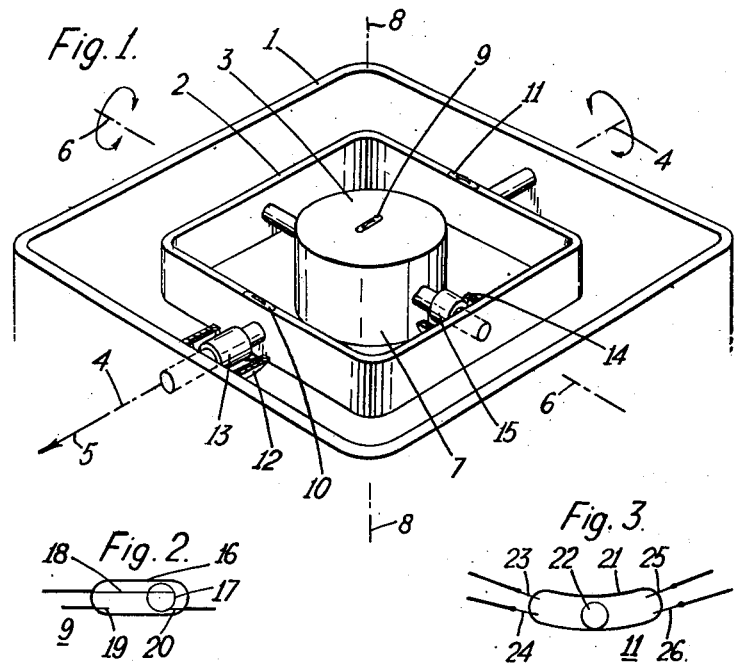
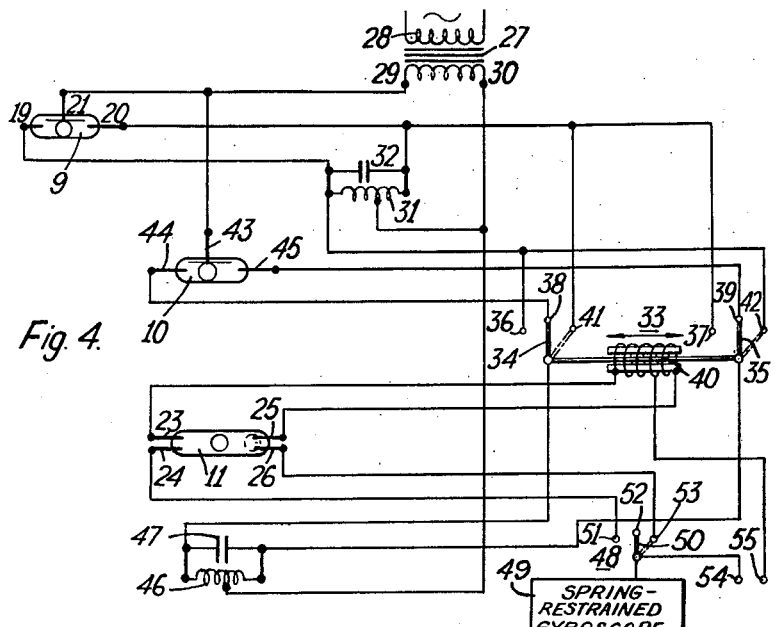
Inventors
ALASTAIR MICHAEL ADAIR MAJENDIE
HEINZ POLLAK
By
Moore & Hall
Attorneys

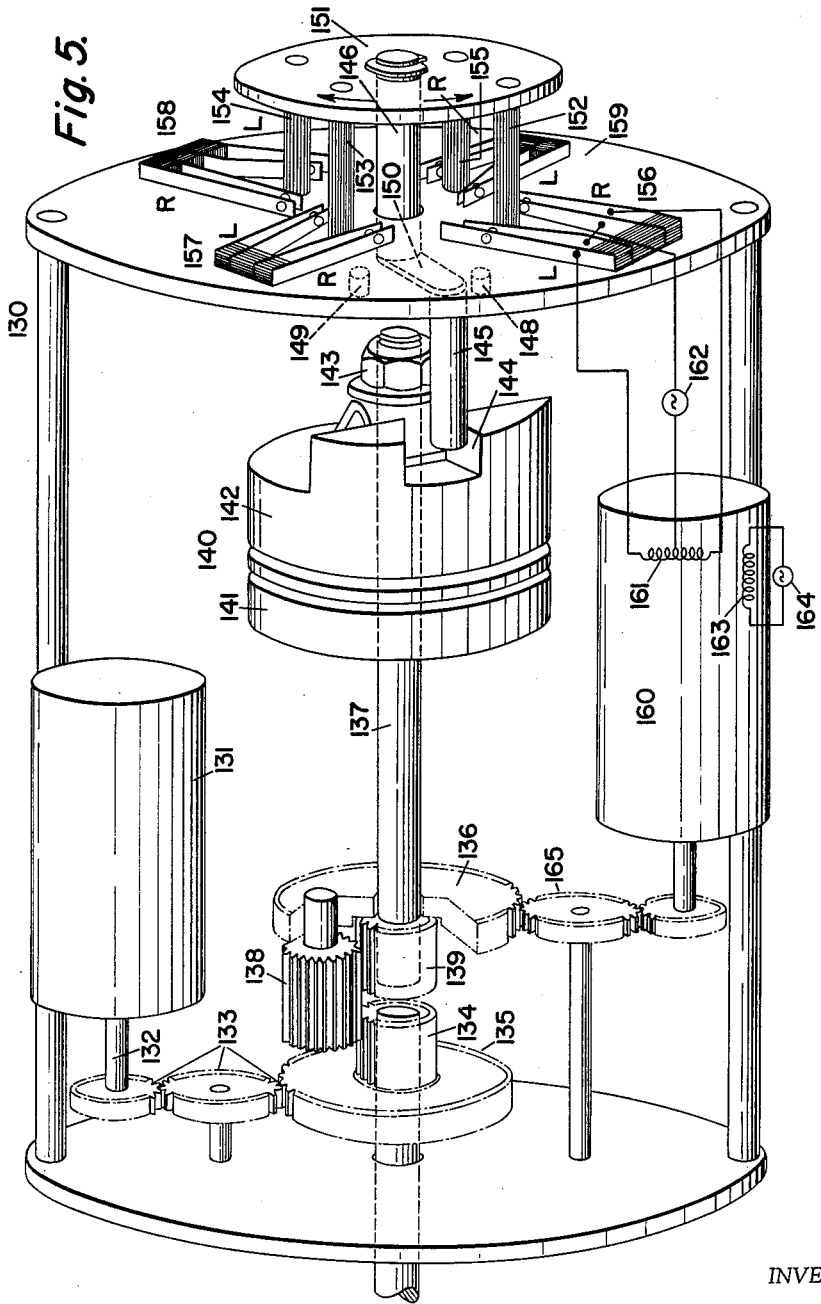

3,077,787
GYRO VERTICALS
Alastair Michael Adair Majendie, Cookham Dean, and Heinz Pollak, Cheltenham, England, assignors to Smiths America Corporation, Washington, D.C.
Filed Apr. 14, 1958, Ser. No. 728,317
Claims priority, application Great Britain, Apr. 15, 1957
11 Claims. (Cl. 74—5.47)

The present invention relates to gyro verticals such as are used on moving craft, in particular an aircraft, having a spin axis (normally substantially vertical) and two precessional degrees of freedom, about the pitch and roll axes of the craft respectively.

In instruments of this kind torque generating means are provided to exert precessing torques about the roll and pitch axes, and precess the gyroscope about the pitch and roll axes (the pitch and roll erection torques respectively) which operate conventionally under the control of gravity-responsive devices in straight and level flight to erect the spin axis into a datum position in relation to, usually of coincidence with, the direction of gravity. It has been proposed in such an instrument to energise the roll erection torque generating means during turning flight in accordance with deviation of the spin axis from the vertical in the pitch direction, making use of the fact that a pitch error at any instant would give rise to a bank error 90° later in the turn, this mode of energisation being sometimes called "pitch-bank erection." Various criteria have been proposed to determine when the change between normal and pitch-bank erection should take place, for example lateral acceleration of the craft (as determined by, e.g., a mercury switch) angle of bank (as determined by displacement of the spin axis in roll in relation to the instrument case) or rate of yaw (as determined, e.g. by a spring-restrained gyroscope) which suffer from various disadvantages, and a further arrangement for the determination of the change is disclosed in the specification of U.S. Patent No. 2,906,127, assigned to Smiths America Corporation.

The disadvantage of using either lateral acceleration or measured angle of bank alone as the criterion to determine the change between normal and pitch bank erection is the risk that certain flight manoeuvres may result in the aircraft returning to level unbanked flight with a residual bank error in the alignment of the spin axis of the gyro, sufficient to introduce or retain pitch bank erection in sensibly straight flight. Under these conditions positive control of the gyro in roll has been lost, and substantial errors may result and persist.

The disadvantage of using rate of yaw as the criterion is the risk that under turbulent conditions of sensibly straight and level flight pitch bank erection in either one sense or the other may be applied almost continuously and the time for which normal erection is provided may be insufficient to retain positive control of the gyro in roll.

It is an object of the present invention to provide criteria to determine the change between pitch-bank and normal erection which are comparatively simple and do not involve substantial risk of loss of control over the gyroscope's position.

According to the present invention we provide in combination with a gyro vertical for use on aircraft having provision for pitch bank erection means responsive to turn in azimuth of the aircraft and means responsive to the measured angle of bank or lateral acceleration of the aircraft, which said means jointly control the change from normal to pitch bank erection so that the change occurs if and only if the two quantities to which the means are respectively responsive both exceed predetermined values thereof.

The means responsive to turn may comprise a conventional spring restrained gyroscope. Alternatively, they may comprise means associated with some directional responsive device, such as, for example, a repeater associated with a gyro-magnetic compass. The said means may merely comprise a switch operated when the aircraft diverges by more than some predetermined amount from an established heading, a tachometer driven through a lost motion connection from a repeater, or a switch operated only when both the magnitude of turn from an established heading and rate of turn in azimuth exceed predetermined values, for example as shown in copending U.S. Patent No. 2,906,127, granted September 29, 1959 to Burden et al. and assigned to a common assignee, Smiths America Corporation, a body corporate of the State of Maryland.

By an "established heading" we mean a heading which has remained substantially constant (apart from short period oscillatory variations) for a predetermined period of time.

If means responsive to measured angle of bank are used, these may conveniently comprise a switch operated when displacement in roll between the gyro vertical spin axis and some datum fixed in the aircraft exceeds some predetermined value.

Alternatively, if means responsive to lateral acceleration are used, they may comprise a mercury switch mounted athwartships on the usual inner or outer gimbals of the gyroscope.

A gyro vertical suitable for aircraft and constructed in accordance with the invention will now be described with reference to the accompanying drawings of which FIGURE 1 is a partly cut-away perspective view of the gyro vertical, FIGURE 2 is a side view of mercury switch 9, FIGURE 3 is a side view of mercury switch 11, and FIGURE 4 is a diagram of an associated control circuit.

FIGURE 5 is an elevation showing certain components of the invention in greater detail.

Referring to FIGURE 1, the gyro vertical is housed in a conventional case 1, normally fixed in the aircraft, and has an outer gimbal ring 2 journalled in the case for rotation in roll in which is, in its turn, gimballed a rotor casing 3 for rotation in pitch. The roll axis is indicated at 4 and arrow 5 indicates the direction of flight. The pitch axis is indicated at 6. The rotor casing carries internally a conventional electrically driven rotor indicated at 7 having its spin axis 8 normally vertical, and externally a mercury switch 9 responsive to tilt in the pitch direction. Two further mercury switches 10 and 11 are mounted on the outer gimbal ring, one (10) being responsive to tilt in the roll direction, and the other (11) being responsive to lateral acceleration.

A pitch erection torque motor has its stator 12 fixed to case 1 and its rotor 13 attached to outer gimbal ring 2 so that it may apply a torque about the roll axis (and thus erect the spin axis in pitch). A roll erection torque motor has its stator 14 fixed to outer gimbal ring 2 and its rotor 15 attached to rotor casing 3 so that it may apply a torque about the pitch axis (and thus erect the spin axis in roll).

Referring to FIGURES 2 and 3, mercury switch 9 comprises a straight glass tube 16, a mercury globule 17, a central electrode 18, and end electrodes 19 and 20. Connection is established between the central electrode and one or other of the end electrodes, which depending on the direction of tilt, when the direction of the spin axis of the gyroscope deviates in pitch from the direction of apparent gravity by more than some predetermined amount. Mercury switch 10 is identical with switch 9 and is responsive in a similar way to tilt of the gyroscope spin axis in the roll direction. Mercury switch 11 comprises a curved glass tube 21, a mercury globule 22, two electrodes 23 and 24 at one end of the tube, and two further electrodes 25 and 26 at the other end. The switch is mounted on outer gimbal 2 with its longitudinal axis in a plane perpendicular to the direction of flight, the ends of the tube being higher than its central portion. Connection is established between electrodes 23 and 24 when the lateral acceleration exceeds some predetermined amount in one direction, and between electrodes 25 and 26 when it exceeds the same amount in the other direction.

Referring now to FIGURE 4, a transformer 27 has a primary coil 28 which is connected to an A.C. power supply, and a secondary coil with end terminals 29, and 30. The pitch erection torque motor has a centre-tapped control winding 31 the outer terminals of which are connected respectively to end electrodes 19 and 20 of switch 9 and the centre tap of which is connected to terminal 30. A capacitor 32 is wired in parallel with winding 31. Central electrode 21 of switch 9 is connected to terminal 29.

A three position, two pole, switch 33 operated by a centre-tapped solenoid 40 has moving contacts 34 and 35 which respectively engage in a first extreme position fixed contacts 36 and 37, in the central position fixed contacts 38 and 39, and in the second extreme position fixed contacts 41 and 42. Contacts 36 and 42 are connected to electrode 19 of switch 9, and contacts 41 and 37 are connected to electrode 20. Contacts 38 and 39 are respectively connected to end electrodes 44 and 45 of switch 10. The central electrode 43 of this switch is connected to terminal 29. The roll erection torque motor has a centre-tapped control winding 46, the outer terminals of the winding being connected respectively to moving contacts 34 and 35 of switch 33 and the centre tap being connected to terminal 30. A capacitor 47 is wired in parallel with winding 46. A three position, single pole switch 48 operated by a conventional spring restrained gyroscope (indicated at 49) sensitive to turn, has a moving contact 50 which engages a fixed contact 51 in a first extreme position, a fixed contact 52 in a central position, and a fixed contact 53 in the second extreme position. Moving contact 50 is connected to one terminal 54 of a D.C. supply, the other terminal 55 of which is connected to the centre-tap of solenoid 40. Fixed contacts 51 and 53 are connected respectively to electrodes 24 and 26 of switch 11, while contact 52 is left unconnected. Electrodes 23 and 25 are connected respectively to the outer terminals of solenoid 40.

Gyroscope 49 operates switch 48 so that moving contact 50 engages fixed contact 51 when the aircraft turns in one direction and fixed contact 53 when it turns in the other direction. When the aircraft is not turning the moving contact engages fixed contact 52.

The operation of the gyro vertical, will now be described. When the aircraft is flying along a straight path moving contact 50 of switch 48 engages contact 52 and electrodes 24 and 26 of switch 11 are disconnected from electrodes 23 and 25 respectively. Solenoid 40 is therefore de-energised and the moving contacts of switch 33 are in their central position. Energisation of the pitch erection torque motor is controlled by switch 9, and of the roll erection torque motor by switch 10. When the aircraft starts a turn switches 48 and 11 are actuated to energise solenoid 40 in the appropriate direction (e.g. contact 50 engages contact 51 and electrodes 23 and 24 are connected). Switch 33 is moved into an extreme position and the roll erection torque motor is energised in the appropriate direction under the control of switch 9—i.e. pitch bank erection is established.

It will be appreciated that although development of a fault in the spring restrained gyroscope (the turn responsive means) may result in loss of pitch bank erection it will not result in loss of normal control. For example should switch 48 remain permanently in a position corresponding to straight flight, normal erection will be applied whatever the lateral acceleration, as will be the case also if switch 48 is in a position corresponding to a direction of turn different from that signified by the lateral acceleration mercury switch 11.

As an alternative to a spring restrained gyroscope the means responsive to turn may as mentioned above comprise means associated with some directional responsive device, such as a repeater associated with a gyromagnetic compass.

A device incorporating a gyro-magnetic compass repeater, the tachometer driven through a lost motion connection; the magnitude of turn switch and the measured angle of bank means is disclosed in British Patent No. 812,294 and is reproduced here in FIGURE 5. This device is indicated generally at 130 and has a directional gyroscope controlled repeater which rotates a shaft 132 in accordance with changes in the heading of the aircraft. Shaft 132 drives, through gears 133, a sun pinion 134 which constitutes one input member of an epicyclic differential 135. The other input member of the differential is a wheel 136, mounted for free rotation about a shaft 137 coaxial with pinion 134. Wheel 136 carries a stub shaft upon which is mounted for free rotation a planet pinion 138 which meshes both with pinion 134 and with a further pinion 139 fixed to shaft 137 and having one tooth more than pinion 134. Thus it will be seen that rotation of pinion 134 and wheel 136, shaft 137 is rotated through an angle which is a sum of multiples of these rotations.

Shaft 137 drives the driving member, 141, of a friction clutch generally indicated at 140. The driven member of the clutch is indicated at 142. The slipping torque of the clutch may be adjusted by means of nut 143. Driven member 142 is provided with a slot 144. A pin 145, mounted on a shaft 146, coaxial with shaft 137, by means of a crank 150, may engage with the walls of slot 144, thus providing a lost motion connection between shafts 137 and 146. Shaft 146 passes through a plate 147 of insulating material on which are formed bosses 148, 149 limiting movement of crank 150. Shaft 146 carries a plate 151 on which are mounted four pegs 152, 153, 154 and 155 of insulating material, extending towards plate 147. These pegs are arranged to operate respectively four generally similar sets of spring loaded pairs of contacts 156, 157, 158 and 159. Contacts 156 are so arranged that any movement beyond a predetermined small amount of crank 150 from a position midway between bosses 148, 149 results in closure of one or other of the two contacts, labeled 156L and 156R respectively. Contacts 156L and 156R control the energization of a centre tapped winding 161 of a two-phase induction motor 160 from an A.C. source 162. The other phase winding 163 of motor 160 is constantly energized from a further source 164 in quadrature with source 162. Motor 160 drives gear 136 (of differential 135) through gears 165. The connections to motor 160 are such that if rotation of repeater 131, and thus, pinion 134, and hence of shaft 137, occurs in a sense to produce closure of, say, contacts 156L, the rotation of motor 160 is in a sense to re-open them. Such rotation will be produced by a left turn of the aircraft; and a corresponding state of affairs holds for a right turn.

The remaining sets of contacts 157 to 159 are not operated until crank 150 has moved a distance, greater than that corresponding to closure of one or other of contacts 156L, 156R but short of engagement with bosses 148 and 149, from its mid position, whereupon all the corresponding contacts ("L" or "R" as the case may be) are engaged simultaneously.

The operation of the repeater and associated gyromagnetic compass described above is set forth in British Patent No. 812,294 to which reference is made for additional background.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A gyro vertical for use on aircraft having provision for pitch bank erection wherein there is provided means responsive to turn in azimuth of the aircraft and means responsive to a further variable quantity whose value increases in magnitude during a correctly banked turn of the aircraft as compared with its value in straight and level flight, which said means jointly control the change from normal to pitch bank erection so that the change occurs if and only if the two quantities to which the means are respectively responsive both exceed predetermined values thereof.

2. A gyro vertical as claimed in claim 1 wherein the means responsive to turn comprise means associated with a directional responsive device, such as, for example, a repeater associated with a gyro-magnetic compass.

3. A gyro vertical as claimed in claim 2 wherein the means associated with a directional responsive device comprise a switch operated when the aircraft diverges by more than some predetermined amount from an established heading.

4. A gyro vertical as claimed in claim 2 wherein the means associated with a directional responsive device comprise a tachometer driven through a lost motion connection from a repeater associated with a gyro-magnetic compass.

5. A gyro vertical as claimed in claim 2 wherein the means associated with a directional responsive device comprise a switch operated only when both the magnitude of turn from an established heading and rate of turn in azimuth exceed predetermined values.

6. A gyro vertical as claimed in claim 1, said means responsive to said further variable quantity comprising means responsive to the lateral acceleration of the aircraft.

7. A gyro vertical as claimed in claim 6 wherein the means responsive to turn comprise a conventional spring restrained gyroscope.

8. A gyro vertical as claimed in claim 7 wherein the means responsive to lateral acceleration comprise a mercury switch mounted athwartships on the usual gimbal of the gyroscope.

9. A gyro vertical as claimed in claim 8 wherein the change from normal to pitch bank erection is controlled by an electromagnetically operated switch which is energised from a power supply through the said mercury switch responsive to lateral acceleration and through a further switch operated by the said spring-restrained gyroscope, the mercury switch and the further switch being in series.

10. A gyro vertical as claimed in claim 1, said means responsive to said further variable quantity comprising means responsive to the measured angle of bank of the aircraft.

11. A gyro vertical as claimed in claim 10, said means responsive to measured angle of bank comprising a switch operated when displacement in roll between the gyro vertical spin axis and some datum fixed in the aircraft exceeds some predetermined value.

References Cited in the file of this patent

UNITED STATES PATENTS

| | | |
|---|---|---|
| 2,542,975 | Adkins | Feb. 27, 1951 |
| 2,678,564 | Douglas et al. | May 18, 1954 |
| 2,699,681 | Johnson | Jan. 18, 1955 |
| 2,763,157 | Summers | Sept. 18, 1956 |
| 2,821,087 | Hammon | Jan. 28, 1958 |
| 2,846,890 | Flanagan | Aug. 12, 1958 |

FOREIGN PATENTS

| | | |
|---|---|---|
| 812,294 | Great Britain | Apr. 22, 1959 |